United States Patent [19]

Andris

[11] Patent Number: 4,863,070
[45] Date of Patent: Sep. 5, 1989

[54] METER PUMP FOR LIQUID AND/OR LOW-VISCOSITY SUBSTANCES

[76] Inventor: Raimund Andris, Tannhörnle 7, 7730 Villingen-Schwenningen 22, Fed. Rep. of Germany

[21] Appl. No.: 215,241

[22] Filed: Jul. 5, 1988

[30] Foreign Application Priority Data

Jul. 7, 1987 [DE] Fed. Rep. of Germany ....... 3722413

[51] Int. Cl.$^4$ ............................................. F04B 43/08
[52] U.S. Cl. ................... 222/207; 222/211; 222/212; 222/383; 417/472; 417/480
[58] Field of Search ............. 417/472, 552, 553, 554, 417/480, 273; 222/207, 209, 211, 212, 213, 383, 387

[56] References Cited

U.S. PATENT DOCUMENTS

| 2,824,672 | 2/1958 | Wersching | 222/207 |
| 3,452,905 | 7/1969 | Micallef | 222/207 |
| 4,088,425 | 5/1978 | Bennett | 417/554 |
| 4,732,549 | 3/1988 | Schuckmann | 417/472 |

FOREIGN PATENT DOCUMENTS 597364 8/1959 Italy ..................... 417/472

Primary Examiner—Carlton R. Croyle
Assistant Examiner—D. Scheuermann
Attorney, Agent, or Firm—McGlew & Tuttle

[57] ABSTRACT

A metering pump for discharging metered quantities of liquid and/or low viscosity materials, in particular pasty materials, on bottle-type or can-type containers has a bellows sealed between two coaxial housing parts of dimensionally stable plastic. The housing parts are telescopically movable relative to one another, and provided at each of its two ends with respective inlet and outlet pump valves. Each pump valve has an axially mobile closing element. On its discharge end, the bellows has an integrally molded annular valve seat face, provided with a passage orifice, for a spring-loaded closing element. A bellows seal includes an annular wall surface disposed against a pipe attachment which is integrally molded to a first housing part. The first housing part is provided with a discharge spout and is supported at its end face on an annular shoulder of the bellows. The closing element of the pump inlet valve can initially be integrally injection-molded to the second housing part and severed from the latter during assembly and be brought, by axial displacement into the bellows, into a functionally appropriate position on an annular valve seat face of the bellows.

4 Claims, 2 Drawing Sheets

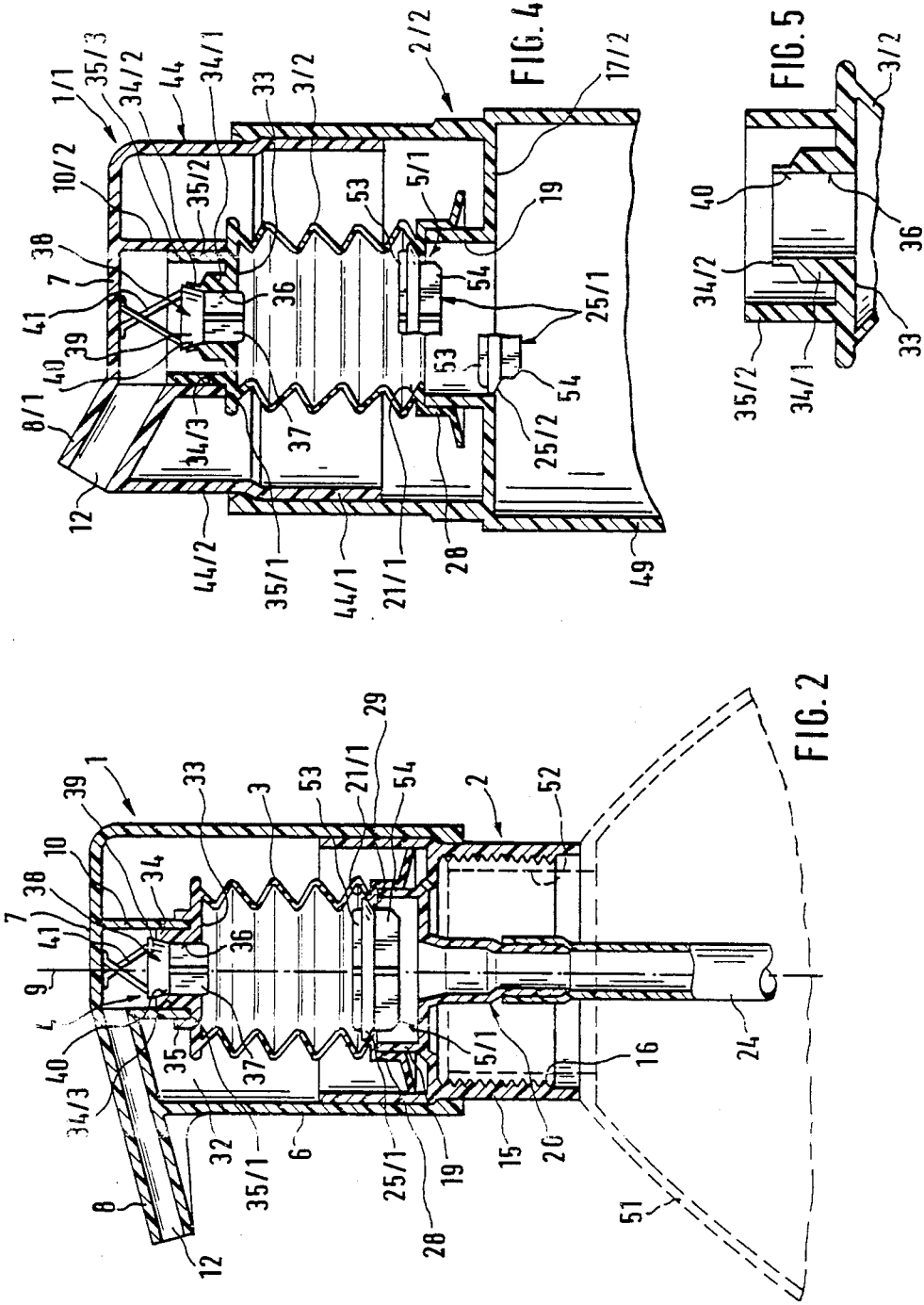

METER PUMP FOR LIQUID AND/OR LOW-VISCOSITY SUBSTANCES

FIELD AND BACKGROUND OF THE INVENTION

This invention relates, in general, to dispensing devices and, in particular to a new and useful metering pump having two telescopically movable parts, one of which defines an inlet connected to a bellows which has an opposite end connected to the other part which has a delivery passage.

The invention relates, particularly, to a metering pump for the delivery of metered quantities of liquid and/or low-viscosity, in particular pasty, media from bottles, cans or the like. A bellows of flexible plastic is arranged in a sealing between two axially telescopically movable housing parts of dimensionally stable plastic. Both ends of the bellows pump have valves which in each case have a closer member which is movable axially relative to a valve seat ring surface. The valve seat ring surface on the intake side is molded onto the bellows and the first housing part is provided with a delivery mouthpiece and the second housing part is capable of being fitted on the neck of a bottle, can or the like or being provided with a molded-on container.

In the case of a known, manually operated bellows spray pump (German patent No. 2,842,073) for a liquid media, the end section on the discharge side, which forms the last fold, is clamped fixedly between two interlocking housing parts. The end section on the delivery side of the bellows, which is provided with an intake extension in the form of a hose and with a conical valve seat annular surface for a ball as closing member, is seated positively fixed in an axially movable tensioning and compressing member, which is under the effect of a compression spring acting in delivery direction. For the intake of liquid from a container, the bellows must be stretched axially with simultaneous tensioning of the compression spring.

Thereafter, the compression spring exerts a constant delivery pressure on the bellows. As a delivery device, a spray nozzle is arranged at the end of a spring-loaded tube which is axially movable in an end wall of a housing part. The tube nipple has a flange ring and, outside thereof, a transverse bore which can be closed by a ring seal and becomes free when the tube nipple is pushed into the end wall. Apart from the fact that, with this device, only a liquid medium, not metered quantities, can be delivered, the structure and mode of operation is much too complex and elaborate for mass production. This device is not suitable for the delivery of pasty media, because the pump valve on the delivery side has an only very small passage cross-section.

In the case of another known metering pump with pump bellows (German patent No. 3,509,178) the two mutually axially displaceable housing parts are in each case provided with a transverse wall running at right angles to the axis of the bellows. These transverse walls have in each case on the sides facing each other annular ribs each for the sealing reception of a bellows. In addition, bores with a valve seat ring surfaces and the associated closing members of the pump valves are arranged in these two transverse walls. While the transverse walls of the housing part provided with the delivery mouthpiece is provided with a tube socket protruding into the bellows, for guidance of the closing member of the pump valve on the delivery side, the transverse wall of the second housing part has a tube socket arranged on the side opposite the bellows for guidance of the closing member of the pump valve on the intake side. At the same time, this tube socket is provided with a socket of tapered diameter for the fastening of intake hose. Both housing parts are provided with cylindrical guide walls which fit telescopically one in the other, the second housing part being provided in the region outside the transverse wall with an internal thread by which it can, for example, be screwed onto the external thread of a bottle neck or a can neck.

While the closing member of the pump valve on the intake side is accommodated loosely in the tube socket of the transverse wall of the second housing part by means of annular ribs arranged in star shape and is secured against falling out by claw-like fingers protruding into the inside of the bellows, the closing member of the pump valve on the delivery side has molded-on spring members which push it with slight axial pressure on the valve seat ring surface and hold it in closed position. These spring elements are supported on an end wall of the housing part provided with the delivery mouthpiece. In order to bring this closing member into its working position, it is necessary that this first housing part is provided with a removable or subsequently attachable end wall, for the attachment of which a special operation is necessary in each case.

SUMMARY OF THE INVENTION

The invention provides a metering pump which can be produced with a minimum of individual parts and, consequently, with low production costs, in particular assembly costs. It also must be taken into consideration that such metering pumps are produced in very high numbers (millions) as mass-produced articles, so that even slight reductions in production costs are of very great economic significance.

In addition, the invention is intended to achieve an improvement in the functional reliability, in particular the leakproofness both of the pump valves and of the connections between the bellows and the two housing parts.

According to the invention, the bellows has, at its delivery end, an integrally molded-on end wall provided with a passage opening and a valve seat ring surface for the spring-loaded closing member, and bears by means of an annular wall surface in a sealing manner against a tube socket which is integrally molded onto the housing part provided with the delivery mouthpiece and is supported at its end on an annular shoulder of the bellows.

The main advantage achieved thereby is that the housing part provided with the delivery mouthpiece can be produced as one piece and, once the closing member of the pump valve on the delivery side has been placed on the valve seat ring surface of the bellows, the housing can be fitted as a finished part, at the same time establishing its connection with the bellows, onto a second housing part. In addition, better sealing qualities are produced between a relatively hard closing member and a soft valve seat than with equally hard materials.

One development of the metering pump has the effect of creating favorable conditions for a good guidance of the closing member and for a stable connection between the first housing part and the bellows.

Another development of the invention has the effect of also ensuring a completely airtight closed position, with low closing forces, between the closing member and the valve seat ring.

In order to bring about in a simple way a sealtight connection between the housing part provided with the delivery mouthpiece and the bellows, even under high pressure, is effected by another development of the invention. It is advantageous if the closing member of the pump valve on the delivery side is provided with spring elements supported against the end wall of the housing part, which elements hold it in closed position.

In another development, in addition to a sealtight and stable connection between the bellows and the one housing part, the highly significant advantage in terms of production engineering is achieved that the annular lip, which is thin and therefore sensitive to external mechanical effects, on the valve seat collar, is protected against damage, for example when falling out the injection-molding machine or when transported loose in boxes.

A development of the invention makes it possible to arrange the pump valve on the intake side inside the bellows thus keep the working pressure away from the connecting existing between the bell socket of the bellows and the annular wall of the second housing part. Consequently, a higher operational reliability, and, in particular, a better leakproofness are also achieved.

Another development ensures that the working stroke of the bellows is not reduced by the closing member of the pump valve on the intake side, that the closing member has an easy action within its valve seat ring surface and that no contact over a large area with other parts, which could lead to adhesion, can occur on the upper side of the closing member.

With the invention, it is possible to injection-mold the closing member of the pump valve on the intake side in on operation with the second housing part and bring it into its operative working position by a single additional operation. This is another way in which an additional cost savings can be achieved, which is of great economic significance in the case of the mass production envisaged for such metering pumps.

Accordingly, it is an object of the invention to provide a device for metering liquids of all types, for example, from articles such as cans and bottles and which includes a first and second telescopic housing parts which are arranged for telescopic movement between certain limits and which have a bellows disposed therebetween which is connected at one to an inlet having a closing valve at the inlet to the bellows and an outlet at its opposite end connected to a delivery passage formed in the other housing part.

A further object of the invention is to provide a dispenser which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

BRIEF DESCRIPTION OF THE DRAWINGS

In the drawings:

FIG. 2 is a sectional view of a further embodiment of a metering pump, in which the valve on the intake side is of a different design than in the case of the metering pump of FIG. 1;

FIG. 4 is a view similar to FIG. 1 of a metering pump of a paste dispenser in which the end of the pump valve on the delivery is of a different design than in the case of the paste dispenser of FIGS. 1, 2 and 3; and FIG. 5 is an enlarged sectional view of the end section on the delivery side of the bellows of FIG. 4.

GENERAL DESCRIPTION OF THE PREFERRED EMBODIMENTS

Figure 3:
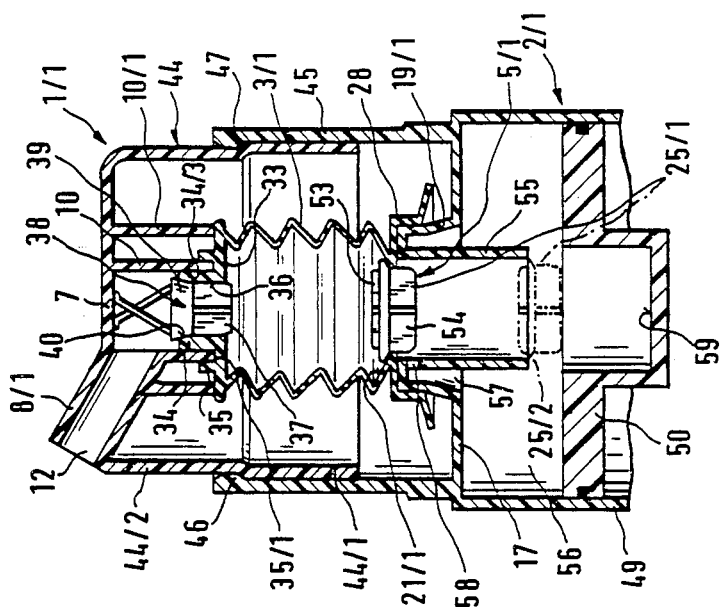
FIG. 3 is a view similar to FIG. 1 of a metering pump for a paste dispenser, in which a paste container is integrally molded onto the second housing part.

Referring to the drawings, in particular, the invention embodied therein comprises a metering device of dispenser which includes first housing part 1 which is telescopically engageable with a second housing part 2 and is movable in respect thereto through certain defined vertical movement range set by shoulders formed between the cooperating parts. In accordance with the invention, the upper housing part 1 carries a delivery channel 12 which is connected internally through a passage formed in the housing part to one end of a bellows 3 which has an opposite end which is connected to an inlet passage 24 of the other housing part 2. The bellows 3, in accordance with the invention, is formed with end walls which define valve seats for respective inlet and outlet for delivery flow in which includes a spring-biased valve member at the delivery end.

Figure 1:
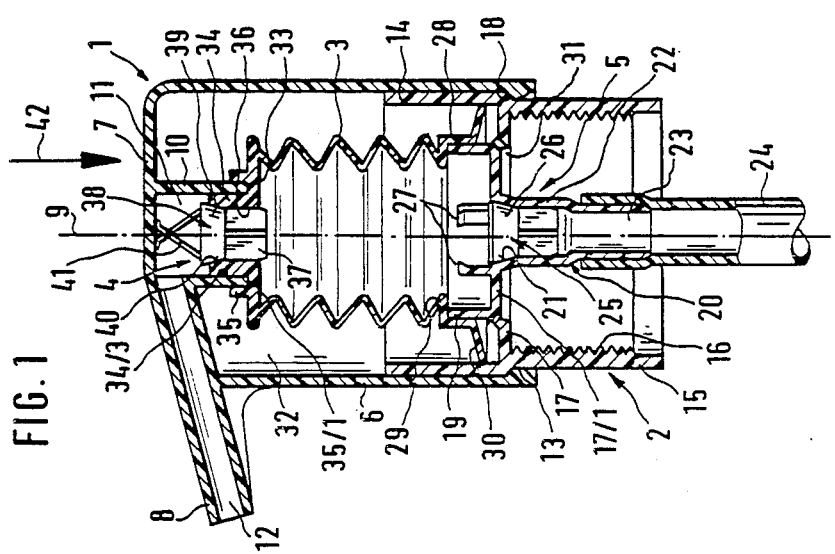
FIG. 1 is a sectional view of a first embodiment of a metering pump.

Two different types of metering pumps are represented in the drawings. FIGS. 1 and 2 show in each case metering pumps which serve in particular for the metered delivery of liquid and fluid media and are designed in such a way that they can be screwed onto bottles or cans. The metering pumps represented in FIGS. 3 and 4, are component parts of so-called paste dispensers, the basic mode of operation being the same, however, with both types.

The metering pump represented in FIG. 1 comprises two cylindrical housing parts and 2, a bellows 3 and two pump valves 4 and 5 arranged at the ends of the bellows 3. While the two housing parts 1 and 2 are made of hard, dimensionally stable plastic, the bellows 3 is made of a soft, dimensionally flexible plastic which is also capable of applying the restoring forces necessary for the pumping operation.

The housing part 1 is produced as a one-piece injection molding, and it has a cylindrical tube body 6, an end wall 7, a delivery mouthpiece 8 and a tube socket 10, arranged concentrically to the tube body axis 9 on the inside of the end wall 7, the interior 11 of which socket is in connection with the delivery channel 12 of the delivery mouthpiece 8. On its end section opposite the end wall 7, the tube body 6 is provided with an inwardly projecting annular rib 13.

The housing part 2 is likewise produced as a one-piece injection molding of hard, dimensionally flexible plastic, and comprises a guide tube piece 14, accommodated axially displaceably in telescopic manner in the tube body 6 of the housing part 1, and of a threaded tube piece 15, provided with an outside diameter reduced by the radial thickness of the annular rib 13 and having an internal thread 16, as well as of a transverse wall 17 which is arranged at the point where the guide piece 14 and the threaded tube piece 15 merge. The different outside diameters of the two tube pieces 14 and 15 have the effect of forming an annular shoulder 18 which serves as a stop for the annular rub 13 of the housing part 1. The transverse wall 17 is provide with annular wall 19, directed toward the end wall 7, and with a transverse wall section 17/1, offset outwardly axially relative to the transverse wall 17 by approximately the thickness of the wall 17. A tube socket 10 of graduated diameter is molded on the opposite side of the wall 17 and it has an upper section which has on the inside a conical valve seat ring surface 21 and a cylindrical guide section 22 to which a coupling piece 23 joins for the reception of an intake hose 24. In the guide section 22 of the tube socket 20, a closing member 25 with a conical head part 26 is located axially movably and is secured against falling out by claw-like guide elements injection-molded onto a transverse wall section 17/1. The head part 26 of the closing member 25 and the valve seat ring surface 21 together form the pump valve 5 on the intake side. In the guide section 22 of the tube socket 20, the lower guide part 27 of the closing member 25, consisting of a cross rib, is accommodated.

The bellows 3 is provided at its lower end with a bell socket 28, enclosing in sealing manner the annular wall 19, and with a flange-like annular part 29 which is seated on the end face of the annular wall 19. Adjoining the lower end of the bell socket 28 is an obliquely outward running annular lip 30, which bears in sealing manner against the inside surface of the tube piece 14 whenever liquid leaks through a vent opening 31 in the transverse wall 17 of the housing part 2 and presses against the annular lip 30, for example when a bottle is lying down or standing on its head, but which annular lip allows air to flow into the vent opening 31 during the suction stroke of the upper housing part 1, taking place oppositely to the direction of arrow 42. In order that air can also flow from the outside into the interior 32 of the upper housing part 1, it is expedient also to provide the housing part 1 with a vent opening at an appropriate place. However, it may also be adequate to choose the axial play between the two housing parts 1 and 2 large enough that sufficient air can flow through the annular gap existing between these two parts into the interior or out of it.

At its upper end, the bellows 3 is provided with an end wall 33, which has a valve seat collar 34 protruding into the tube socket 10 of the end wall 7 of the housing 1, and an annular lip 35 enclosing in sealing manner the lower section of the tube socket 10. In this arrangement, the outer circumferential surface of the valve seat collar 34 forms a surface 34/3 which bears in sealing manner against the inside surface of the tube socket 10. The valve seat collar 34 forms with the annular rib an annular groove, the bottom surface of which represents an annular shoulder 35/1 on which the tube socket 10 is supported at its end. The bore 36 of the valve set collar 34 accommodates the lower guide part 37. The guide part 37 includes a cross rib, of a closing member 38 made of hard plastic, the conical closing head 39 of which is seated in sealing manner on a likewise conical valve seat ring surface 40 of the valve seat collar 34 made of the same soft, flexible plastic as the bellows 3 and is provided with two spring elements 41 supported on the inside of the end wall 7 of the housing part 1. The spring elements 41 normally hold the closing member 38 with slight closing pressure on the closed position shown in FIG. 1, but allow an axial movement of the closing member 38 towards the end wall 7 whenever the housing part 1, actuated manually in the direction of arrow 42, executes its working and delivery stroke. During the delivery stroke, the lower pump valve 5 is closed, so that the medium in the interior of the bellows 3 can escape to the outside only through the pump valve 4 on the delivery side to the the delivery mouthpiece 8 or through the delivery channel 12. In the opposite return and intake stroke, in other words, when the housing part 1, driven by the spring force of the bellows 3, again moves upwards relative to the fixed housing part 2, oppositely to the direction of arrow 42, the pump valve 4 remains closed and a corresponding quantity of the bottle contents is taken into the bellows 3 by the automatically opening pump valve 5 through the tube socket 20 and the intake hose 24.

Due to the valve seat collars 34, which is made of the same soft material as the bellows 3 since it is integrally molded onto the latter, and which protrudes in sealing manner into the tube socket 10 of the housing part 1, a pressure developing or existing inside the bellows 3 can only improve the leakproofness or the tightness of the connection between the tube socket 10 and the valve seat collar 34. Due to the fact that the valve seat collar 34, with its valve seat ring surface 40, is made of softer material than the closing member 38, a better closing characteristic of this pump valve 4 is also achieved than in the case of the pump valve 5 on the intake side in which the closing member 25 is made of material which is at least approximately as hard as the tube socket 20 on which the valve seat ring surface 21 is formed.

Due to the arrangement of the valve seat ring surface 40 of the pump valve 4 on the delivery side in the valve seat collar 34 integrally molded onto the bellows 3, the advantage is also achieved that the end wall 7 can be arranged integrally on the housing part 1. It is namely possible to insert the closing member 38 into the valve seat collar 34 before the latter is pushed into the tube socket 10 of the housing part 1.

The metering pump represented in FIG. 2 differs from that of FIG. 1 only in that the pump valve 5/1 on the intake side has, instead of a plug-shaped closing member accommodated in the tube socket 20, a plate-like closing member 25/1, which is seated inside the bellows 3 on a conical valve seat ring surface 21/1, which is formed by the first fold section of the bellows 3 adjoining the annular part 21. With the exception of the guide elements 27, which are not present in the embodiment of FIG. 2, all other parts are designed exactly the same as in the case of the embodiment of FIG. 1. Also indicated in FIG. 2, by broken lines, is the upper part of a bottle 51, on the bottle neck 52 of which the housing part 2 of the metering pump is screwed.

The plate-like closing member 25/1 is provided on its upper and lower sides in each case with crosswise ribs 53 and 54, respectively. While the lower ribs 54 serve to center the closing member 25/1 in the annular part 29, the ribs 53 prevent contact over a surface area and thus adherence to the inside of the end wall 33 of the bellows 3.

The shape and arrangement of the closing member 25/1 functionally has the advantage that the pressure building up inside the bellows 3 during the delivery stroke cannot act on the bells socket 28, so that the occurrence of a leak at this point is prevented with great certainty, even if this delivery pressure becomes very high, for example due to a clogged delivery channel 12.

In FIG. 3, the metering pump of a paste dispenser is represented, in which the housing part 1/1 executing the pumping strokes is accommodated by a cylindrical tube body 44 axially movably in telescopic manner in a cylindrical guide tube 45 of a second housing part 2/1. While the lower section 44/1, protruding into the guide tube 45, has a somewhat larger diameter than the upper section 44/2, protruding out of the guide tube 45, an inwardly projecting annular rib 46 is provided on the upper end section of the guide 45, which annular rib forms an axial stop for the annular shoulder 47 of the tube body 44, said shoulder being formed between the two sections 44/1 and 44/2. Moreover, the housing part 1/1 of the paste dispenser of FIG. 3 differs from the housing part 1 of the metering pump of FIG. 1 also in that it has an obliquely upwardly directed delivery mouthpiece 8/1 with a delivery channel 12 and, concentric to the tube socket 10, an additional support ring 10/1 on the inside of its end wall 7, which support ring is seated by an end face on the annular shoulder 35/1 formed on the outer end face of the bellows 3. The pump valve 4 is of precisely the same design as in the case of the exemplary embodiment of FIG. 1. The bellows 3/1 also has at its end section on the delivery side exactly the same shape as the bellows 3 in the case of the exemplary embodiment of FIG. 1.

The operating principle of the pump valve 4 on the delivery side, represented in FIG. 3, in conjunction with a paste dispenser, is exactly the same as in the case of the metering pump represented in FIG. 1.

While in the case of the metering pump represented in FIGS. 1 and 2 the closing members 25, 25/1 and 38 in each case have to be produced independently as separate injection moldings and brought into working positions by assembly work, exemplary embodiments of metering pumps are represented in FIGS. 3 and 4 and in which the closing members 25/1 of the pump valve 5/1 on the delivery side are injection-molded together with the housing part 2/a and 2/2, respectively, in one injection-molding operation. In the case of exemplary embodiment of FIGS. 3 and 4, the plate-like closing member 25/1, which has the same or a similar shape as in the case of the exemplary embodiment of FIG. 2 and is likewise seated on a valve seat ring surface 21/1 of the bellows 3/1, is first of all integrally injection-molded onto the lower end of a tube section 55, arranged concentrically to the annular wall 19/1, via thin connecting sections 25/2, as is broken lines in FIG. 3. In the case of the exemplary embodiment of FIG. 4, the closing member 25/1 is first of all integrally injection-molded onto the lower end of an annular wall 19 molded onto the transverse wall 17/2, via thin connecting sections 25/2. After placing the respective bellows 3/1 or 3/2 on this annular wall 19/1 or 19, respectively, of the tube section 55 or of the lower end of the annular wall 19, respectively, these closing members 25/1 are separated in axial direction and at the same time pushed into the bellows 3/1 or 3/2, so that they in each case come to rest there on the valve set ring surface 21/1. Due to the flexibility of the bellows 3/1 and 3/2, this is readily possible.

In the case of the exemplary embodiment of FIG. 3, the tube socket 55 arranged concentric to the annular wall 19/1, which socket projects over half of its overall length into the filling space 56 of the paste container 49, forms, with the annular wall 19/1, an annular chamber 57, which is connected by one or more nozzle-like passages openings 58, i.e., provided with a small passage cross-section, arranged on the upper end of the tube socket 55, to the interior of the tube socket 55. The possibility thus exists of filling this annular chamber 57 with a paste which has a different color to the paste in the filling space 56 and thus to achieve that the strand of paste emerging from the delivery channel 12 of the delivery mouthpiece 8/1 is provided with one or more stripes of paste of different color.

In order to be able to achieve in this embodiment too a complete emptying of the paste container 49 as far as possible a follow-up plunger 50 is arranged in the latter, which plunger has in the center a depression 59, into which the lower part of the tube socket 55 can enter.

In the case of the embodiment of FIG. 4, the end section of the bellows 3/2 on the delivery side is designed differently than in FIGS. 1 to 3.

It has been found in practice that absolutely airtight closing with very low closing forces exerted by the spring elements 41 on the closing member 38 is not ensured if even only one of the two valve parts effecting the closing has an out-of-roundness of, for example 0.01 mm. In order to eliminate this disadvantage, the end wall 33 of the bellows 3/2 is provided with a valve seat collar 34/1, which has its end on the delivery side a thin annular lip 34/2 as valve seat ring, the inside surface of which forms the valve seat ring surface 40. Due to the small wall thickness of approximately 0.2 to 0.4 mm of this annular lip 34/2, the latter can bear against the conical surface of the closing head 39 absolutely airtightly all around, even with very low axial closing forces of the spring elements 41, even if the annular lip 34/2 itself and/or the conical surface is out-of-round. Whether the valve seat collar 34/1 has a cylindrical or conical shape is only of secondary significance here.

Furthermore, a sleeve socket 35/1 is molded onto the end wall 33, concentrically to the valve seat collar 34/1 at a radial distance around it, which socket has a greater axial length than the valve seat collar 34/1 with its annular lip 34/2.

This sleeve socket 35/2 protrudes into a correspondingly wide tube socket 10/2 in such a way that its outer annular wall surface 35/3 bears in sealing manner against the inside surface of the tube socket 10/1. The tube socket 10/2 is integrally molded on the inside to the end wall 7 of the housing part 1/1. This sleeve socket 35/2 at the same time achieves the advantage that the thin annular lip 34/2, which is sensitive to mechanical effects, is not damaged when such bellows 3/2 are lying loosely as bulk goods in containers or individually fall out of the injection-molding machine into containers, because the sleeve socket 35/2 keeps the other bellows away from the annular lip 34/2. This advantage is of considerable significance for the production and handling of loose bellows, because damage is usually not established until the unit is in the finished state.

The sleeve socket 35/2 could also be arranged in such a way that it encloses the tube socket 10/2. In this case as well, the tube socket 10/2 is supported at its end on an annular shoulder 35/1 of the bellows 3/2, said shoulder surrounding the sleeve socket 35/1.

While specific embodiments of the invention have been shown and described in detail to illustrate the application of the principles of the invention, it will be understood that the invention may be embodied otherwise without departing from such principles.

What is claimed is:

1. A metering pump for the delivery of metered quantities of liquid as well as low viscosity pasty substances from an article such as a bottle and a can, comprising first and second telescopically moving housing parts of dimensionally stable plastic material; a bellows of a flexible plastic arranged in sealing engagement between said coaxially telescopically movable housing parts; inlet and outlet pump valves arranged at respective adjacent ends of said bellows, said pump valves each having a valve seat ring surface and a closing member which is movable axially relative to said valve seat ring surface, said first housing part being provided with a delivery mouthpiece, said second housing part being fittable on a neck of the article, said bellows having an intake end and an opposite delivery end, said bellows having an integrally molded-on bellows end wall provided with a passage opening, provided at said delivery end; at least one spring member biasing said closing member to a closed position said spring member bearing on an end wall of said first housing part, a tube socket integrally molded to said first housing part end wall, said end wall of said bellows first pump valve seat ring surface being provided with valve seat collar enclosing said passage opening, said valve seat collar having a circumferential surface in sealing engagement against the inside surface of said tube socket, said end wall of said bellows being provided with an annular rib closely enclosing said tube socket.

2. A metering pump for the delivery of metered quantities of liquid as well as low viscosity pasty substances from an article such as a bottle and a can, comprising: first and second telescopically moving housing parts of dimensionally stable plastic material; a bellows of a flexible plastic arranged in sealing engagement between said coaxially telescopically movable housing parts; inlet and outlet pump valves arranged at respective adjacent ends of said bellows, said pump valves each having a valve seat ring surface and a closing member which is movable axially relative to said valve seat ring surface, said first housing part being provided with a delivery mouthpiece, said second housing part being capable of being fitted on a neck of the article, said bellows having an intake end and an opposite delivery end; said bellows having an integrally molded-on bellows end wall provided with a passage opening provided at said delivery end, at least one spring member biasing said closing member to a closed position, said spring member bearing on an end wall of said first housing part, a tube socket integrally molded to said first housing part, said end wall of said bellows first pump valve seat ring surface being provided with a valve set collar enclosing said passage opening, said valve seat collar being surrounded at a radial distance by a sleeve socket, said sleeve socket being integrally molded to said end wall of said bellows, said sleeve socket projecting in an axial direction beyond said valve seat collar and protruding in a sealing engagement to said tube socket of said housing part and being provided with a delivery mouth piece.

3. A metering pump for the delivery of metered quantities of liquid as well as low viscosity pasty substances from an article such as a bottle and a can, comprising: first and second telescopically moving housing parts of dimensionally stable plastic material; a bellows of a flexible plastic arranged in sealing engagement between said coaxially telescopically movable housing parts; inlet and outlet pump valves arranged at respective adjacent ends of said bellows, said pump valves each having a valve set ring surface and a closing member which is movable axially relative to said valve seat ring surface, said first housing part being provided with a delivery mouthpiece, said bellows having an intake end and an opposite delivery end; said bellows having an integrally molded-on bellows end wall provided with a passage opening provided at said delivery end; at least one spring member biasing said closing member to a closed position bearing on said first housing part end wall; a tube socket integrally molded to said first housing part, said end wall of said bellows first pump valve seat ring surface being provided with a valve seat collar enclosing said passage opening, said valve seat collar having a circumferential surface in sealing engagement against the inside surface of said tube socket, said end wall of said bellows being provided with an annular rib closely enclosing said tube socket.

4. A metering pump according to claim 1 wherein said valve seat collar is made from a material which is softer than the material of said closing member.

* * * * *